United States Patent
Wu et al.

[11] Patent Number: 5,834,526
[45] Date of Patent: Nov. 10, 1998

[54] EXPANDABLE HOLLOW PARTICLES

[76] Inventors: Huey S. Wu, 25 Harris Cir., Newark, Del. 19711; Fuming Sun, 2447 Black River Rd., Apt. 2, Bethlehem, Pa. 18015; Victoria L. Dimonie, 2118 Huntington St., Bethlehem, Pa. 18017; Andrew Klein, 18 S. Cadillac Dr., Somerville, N.J. 08876

[21] Appl. No.: 891,387

[22] Filed: Jul. 11, 1997

[51] Int. Cl.⁶ .................................................. C08J 9/20
[52] U.S. Cl. ................................................ 521/56; 521/60
[58] Field of Search ......................................... 521/56, 60

[56]     References Cited

U.S. PATENT DOCUMENTS

| | | | |
|---|---|---|---|
| 3,615,972 | 10/1971 | Morehouse, Jr. et al. | 156/79 |
| 4,108,806 | 8/1978 | Cohrs et al. | 521/54 |
| 4,483,889 | 11/1984 | Andersson | 427/389.9 |
| 4,859,711 | 8/1989 | Jain et al. | 521/60 |
| 4,988,567 | 1/1991 | Delgado | 521/60 |
| 5,053,436 | 10/1991 | Delgado et al. | 521/60 |
| 5,429,869 | 7/1995 | McGregor et al. | 428/364 |
| 5,528,650 | 6/1996 | Delgado et al. | 521/60 |
| 5,536,756 | 7/1996 | Kida et al. | 521/60 |

FOREIGN PATENT DOCUMENTS

| | | |
|---|---|---|
| 0 559 253 | 8/1993 | European Pat. Off. . |
| 93/00390 | 7/1993 | WIPO . |

*Primary Examiner*—Morton Foelak
*Attorney, Agent, or Firm*—Gary A. Samuels

[57]     ABSTRACT

Microspheres are described which have a shell of thermally expandable polymer and a hollow interior that contains a fluorinated hydrocarbon that boils at a temperature below the melting point of the polymer, and contains an organic ester or ether or ketone. The ester or ether or ketone improves the quality of microsphere product. The expandable particles are useful in insulation, packaging, for expanding other polymer such as polytetrafluoroethylene, and the like.

8 Claims, No Drawings

EXPANDABLE HOLLOW PARTICLES

FIELD OF THE INVENTION

This invention relates to hollow expandable thermoplastic polymer particles, and more particularly to such particles that contain a heat-expandable fluid within the particles.

BACKGROUND OF THE INVENTION

Thermoplastic hollow expandable particles having volatile liquid blowing agents encapsulated therein are described in U.S. Pat. No. 3,615,972 to Morehouse, et al. The blowing agents are described as aliphatic hydrocarbons, chlorofluorocarbons, or tetraalkyl silanes. The particles are said to be prepared by combining an oil phase containing monomer and blowing agent with an aqueous phase, and agitating violently. Use of perfluorinated blowing agents or ways to improve encapsulation of such blowing agents are not described.

U.S. Pat. No. 4,108,806 to Cohrs, et al., teaches that the expandable synthetic resinous microspheres of U.S. Pat. No. 3,615,972 can be mixed with certain resins and extruded, thereby incorporating the microspheres in the resin and then the microspheres expanded. The only microspheres exemplified are ones made of a copolymer shell of styrene and acrylonitrile having isobutane encapsulated therein. U.S. Pat. No. 5,429,869 to McGregor, et al., describes use of the microspheres of U.S. Pat. No. 3,615,972 in a process for expanding polytetrafluoroethylene.

PCT Publication No. WO 93/00390 to 3M Corporation describes composite articles of a fibrillated polyolefin matrix and energy expandable hollow polymeric particles, which upon expansion of the particles provides thermal insulation. This publication teaches that the expandable microspheres are made of a shell of vinyl or vinylidene halides or copolymers of styrene or methylmethacrylate. The blowing agents are described as those disclosed in U.S. Pat. No. 3,615,972 and U.S. Pat. No. 4,483,889. Use of perfluorobutanes, perfluoropentenes and perfluorohexanes is described, but no means of incorporating such compounds inside the microspheres is taught.

EP 559254A1 teaches thermoplastic microspheres that contain chlorine-free aliphatic fluorocarbon or fluorohydrocarbon. Use of perfluorinated blowing agents or ways to improve encapsulation of such blowing agents is not described.

SUMMARY OF THE INVENTION

It would be desirable to have a hollow expandable particle that contains perfluorinated blowing agents or chloro/fluoro blowing agents. Such a particle would be advantageous for use in applications where nonflamability is important.

This invention achieves these goals by providing an expandable, thermoplastic hollow particle having a generally spherical shape and being between about 1 and 200 micrometers in size; the volume of the hollow portion being 5 to 50% of the total volume; and having encapsulated within the hollow portion:

(i) about 5 to 70 weight percent based on total weight of particle of at least one or more fluorinated hydrocarbon fluids of between 2 and 30 carbons and having a boiling point between about −30° and 300° C., said boiling point being below the melting point of the thermoplastic; and (ii) about 0.1 to 20 weight percent based on total weight of particle of an organic ester or ether or ketone compound of between 4 and 400 carbons;

The fluorinated hydrocarbon fluid can be partially or fully fluorinated. If partially fluorinated, the fluorine content should be at least 10% of the total weight.

The organic ester or ether or ketone is preferably a hydrocarbon with the aforesaid functional groups, and is preferably fluorinated.

Another aspect of the invention is the procedure by which the novel particles are prepared. It has been discovered that encapsulation of fluorinated hydrocarbon fluids inside an expandable thermoplastic shell could be achieved when the aforementioned organic ester or ether or ketone is present in the oil phase.

DETAILED DESCRIPTION OF THE INVENTION

The hollow particles of the invention are generally mono-cell microspheres comprising a shell of an expandable thermoplastic polymer which encapsulates a volatile fluorinated fluid that expands upon heating. Thus, upon heating, the thermoplastic material softens and the volatile fluid expands, causing the entire microsphere to increase in size. On cooling, the thermoplastic shell largely retains its enlarged dimension, even though the volatile fluid contracts towards its original volume. Although as produced, the particles are substantially spherical, it is understood that the thermoplastic is usually resilient and can be compressed or deformed into a non-symmetrical shape.

The microspheres before expansion will generally have a number average diameter of between about 1 and 200 micrometers, preferably 1–100 micrometers, and most preferably 1–50 micrometers, and the shell wall thickness can range from an average of about 1 to 180 micrometers. Dimensions are determined by scanning electron microscopy pictures with visual inspection using a ruler.

Ordinarily, the volatile fluorinated fluid will be retained in the hollow portion after expansion, especially if the shell polymer is impermeable to the fluid. However, upon becoming rigid, the microsphere will retain its shape even if the fluid escapes.

The expandable thermoplastic that can be used in the invention can be an organic polymer made from polymerization or copolymerization of unsaturated monomers selected from (1) nitrile containing compounds such as acrylonitrile, methacrylonitrile, and the like, (2) alkenyl aromatic compounds such as stryene, o-methylstyrene, m-methylstyrene, p-methylstyrene, ethylstyrene, vinyl-xylene, chlorostyrene, bromostyrene, and the like, (3) acrylate or methacrylate containing compounds, such as alkyl acrylates, alkyl methacrylates, wherein the alkyl group has carbon number from 1 to 25, aromatic acrylates, aromatic methacrylates, di-acrylate, di-methacrylate, poly-acrylates and poly-methacrylates monomers, and many other functionality containing compounds like isobornyl acrylate or methacrylate, or some oligomeric acrylate or methacrylate compounds, (4) unsaturated acids of carbon number from 3 to 10, such as acrylic acid, methacrylic acid, itaconic acid, and the like (5) vinyl alkyl ester compounds, such as vinyl acetate, wherein the alkyl group is from carbon number 1 to 25. (6) vinyl alkyl ether compounds, such as butyl vinyl ether, wherein the alkyl group is from carbon number 1 to 25, and (7) halogenated monomers such as vinyl chloride, vinylidene chloride, vinyl bromide, and the like.

The melting point of the thermoplastic is determined by DSC.

The fluorinated hydrocarbon can be organic compounds of between 2 and 30 carbon atoms that contain fluorine and optionally chlorine, oxygen, nitrogen, and hydrogen atoms and have a normal boiling point between −30° C. and 300° C., such as $CF_3CHCl_2$, $CCl_2FCH_3$, $CH_3CHF_2$, $CF_3CClFCHClF$, $CF_3CF_2CHCl_2$, $CF_2ClCF_2CHClF$, $CHF_2CF_2CFCl_2$, $CF_3CHClCCl F_2$, $CF_3CF_2CH_2F$, $CHF_2CF_2CH_2F$, $CF_3CF_2CH_3$, $CF_3CH_2CHF_2$, $H(CF_2)_4H$, $CF_3CHFCHFCF_2CF_3$, $H(CF_2)_6H$, $H(CF_2)_8H$, pentafluorobenzene, and other fluorochloro aromatic compounds, and the like. Preferred are organic compounds of between 2 and 30 carbon atoms in which all of the hydrogen atoms are replaced by fluorine atoms and have a normal boiling point of between −30° C. and 300° C., such as perfluorinated alkanes like perfluorohexanes, perfluoro octanes, perfluoro decalin, perfluoro tetradecahydrophenanthrene and perfluorinated aromatic compounds like hexafluorobenzene, octafluorotoluene, and perfluorinated amines such as perfluoro tripentylamine, and perfluorinated heterocyclic compounds, such as perfluoro butyl tetrahydrofuran.

The fluorinated hydrocarbon is chosen so that it is gaseous at a temperature below the melting point of the thermoplastic polymer.

The organic ester or ether or ketone used herein is a hydrocarbon of between 4 and 400 carbon atoms with ester or ether or ketone functionality. Representative of such compounds include mono-ether, mono-ester, mono-ketone, dibasic esters, polyesters or polyethers such as polyalkylene oxide, polyalkylene glycol, dialkyl ether, dialkyl adipate, dialkyl glutarate, dialkyl succinate, dialkyl suberate, trialkyl citrate wherein the alkyl group is from carbon number 1 to 10. Specific examples are dimethyl adipate, dimethyl glutarate, dimethyl succinate, dimethyl suberate, triethyl citrate, di-butyl ether, alkyl ketone such as heptanone, polybutylene glycol, polybutylene glycol monobutyl ether, polypropylene oxide, poly(propylene oxide/ethylene oxide), and the like. Preferably, the organic ester or ether or ketone compounds are partially fluorinated such as dimethyl perfluoro adipate, dimethyl perfluoro succinate, dimethyl perfluoro glutarate, methyl perfluoro butyl ether, and the like.

The free radical polymerization initiator can be any organic compound that is capable of generating free radicals at certain temperature range. Typical examples include organic peroxides and azo initiators such as azobiscompounds.

To prepare the hollow particles of the invention, an oil mixture is prepared containing the monomer from which the thermoplastic is made, the fluorinated hydrocarbon fluid, the hydrocarbon ester or ether or ketone, and a free radical polymerization initiator. Generally, the amounts of ingredients in this oil mixture will be 10 to 90% by weight of the monomer, 5 to 70% by weight of the fluorinated hydrocarbon fluid, 0.1 to 20% by weight of the hydrocarbon ester or ether or ketone and 0 to 2% by weight of the free radical polymerization initiator and optionally a chain transfer agent from 0 to 2% by weight. Representative chain transfer agents include alkanethiol, alkyl alcohol, such as dodecanethiol, decanol, and the like.

An aqueous mixture is also prepared of water, a colloidal particle dispersion, such as a fumed silica or silica gel or other inorganic colloidal particles, a hydrophilic polymer that thickens the mixture, such as polyvinyl alcohol, polyethylene glycol, polyethylene oxide, dextrin, starch, diethanolamine/adipic acid condensation product, and an aqueous soluble free radical inhibitor such as sodium or potassium dichromate. The composition of the aqueous mixture affects the size of the oil droplets when the two liquids are mixed. The two liquids are mixed by strong mechanical shear force and the mixture is allowed to coalesce. Amounts are 0.2 to 20% by weight of colloidal particles, 0.01 to 10% by weight of hydrophilic polymer, 0 to 1% by weight of an aqueous soluble free radical inhibitor.

The two mixtures are combined in a ratio of between 1:25 to 3:1 oil mixture to aqueous mixture. Depending on the ratio, the size of the resulting hollow microspheres can be controlled. The monomer in the oil droplets is polymerized under mild agitation. Thus, the oil droplets are allowed to coalesce and the monomer is polymerized simultaneously.

The pH is adjusted between 2 and 9, preferably 3 and 7 by using an acid, such as acetic acid, hydrochloric acid, hydronitric acid, and the like.

The mixture is then polymerized further in a pressure reactor under a agitation that allows proper heat transfer between the mixture and the reactor. Polymerization conditions can range from a temperature of between about 5 to 150° C. for 0.1 to 48 hours, and pressures of between about 0.5 to 500 atmospheres. It is understood that the conditions chosen will depend upon the ingredients and ratios used.

The particles can be removed from the reaction mixture by sedimentation or by coagulation using a solvent, such as an alcohol; washed with water and dried. If the product is to isolated as unexpanded particles, it is recommended that it be dried preferably at or below room temperature under vacuum.

The diameter of the droplets of polymerizable oil liquid will determine the diameter of the beads of thermoplastic particles. The droplet diameter will depend upon the ratio of oil to water phase and upon the amount of ingredients in the oil and aqueous liquid.

The aqueous mixture can also contain water-dispersible, water-insoluble solid colloids of inorganic materials such as metal salts or hydroxides or clays, or can be organic materials such as raw starches, sulfonated cross-linked organic high polymers, resinous polymers and the like.

The solid colloidal particles material that is used in the aqueous mixture must be insoluble but dispersible in water and both insoluble and nondispersible in, but wettable by, the polymerizable liquid. The solid colloids must be much more hydrophilic than oleophilic so as to remain dispersed wholly within the aqueous liquid. The solid colloids employed for this process are ones having particles that, in the aqueous liquid, retain a relatively rigid and discrete shape and size within the limits stated. The particles may be greatly swollen and extensively hydrated, provided that the swollen particle retains a definite shape, in which case the effective size is approximately that of the swollen particle. The particles can be essentially single molecules, as in the case of extremely high molecular weight cross-linked resins, or can be aggregates of many molecules. Materials that disperse in water to form true or colloidal solutions in which the particles have a size below the range stated or in which the particles are so diffuse as to lack a discernible shape and dimension are not suitable as stabilizers for limited coalescence. The amount of solid colloid that is employed is usually such as corresponds to from about 0.01 to about 10 or more grams per 100 cubic centimeters of the polymerizable liquid.

In order to function as a stabilizer for the polymerizable liquid droplets, it is essential that the solid colloid must tend to collect within the aqueous liquid at the liquid-liquid interface, i.e., on the surface of the oil droplets. (The term "oil" is used herein as generic to liquids that are insoluble in water). In many instances, it is desirable to add a "promoter"

material to the aqueous composition to drive the particles of the solid colloid to the liquid-liquid interface. This phenomenon is well known in the emulsion art, and is here applied to solid colloidal particles, as an expansion of adjusting the hydrophilic-hydrophobic balance.

Usually, the promoters are organic material that have an affinity for the solid colloid and also for the oil droplets and that are capable of making the solid colloid more oleophilic. The affinity for the oil surface is usually due to some organic portion of the promoter molecule while the affinity for the solid colloid is usually due to opposite electrical charges. For example, positively charged complex metal salts or hydroxides, such as aluminum hydroxide, can be promoted by the presence of negatively charged organic promoters such as water-soluble sulfonated polystyrenes, alginates and carboxymethylcellulose. Negatively charged colloids, such as bentonite, are promoted by positively charged promoters such as tetramethyl ammonium hydroxide or chloride or water-soluble complex resinous amine condensation products such as the water-soluble condensation products of diethanolamine and adipic acid, the water-soluble condensation products of ethylene oxide, urea and formaldehyde, and polyethylenimine. Amphoteric materials such as proteinaceous materials like gelatin, glue, casein, albumin, glutin and the like, are effective promoters for a wide variety of colloidal solids. Nonionic materials like methoxycellulose are also effective in some instances. Usually, the promoter needs to be used only to the extent of a few parts per million of aqueous medium although larger proportions can often be tolerated. In some instances, ionic materials normally classes as emulsifiers, such as soaps, long chain sulfates and sulfonates and the long chain quaternary ammonium compounds, can also be used as promoters for the solid colloids, but care must be taken to avoid causing the formation of stable colloidal emulsions of the polymerizable liquid and the aqueous liquid medium.

There are various additaments which may be made to the polymerization system. For example, encapsulation of a blowing agent is obtained where the initial monomer charge contains a polymer dissolved therein, for example, 10–15 percent by weight polystyrene is readily dissolved in methyl methacrylate and is polymerized in accordance with the examples of this application. Stabilizers, lubricants and similar substances which oftentimes are desirably incorporated into polymeric materials may be added with the monomer or blowing agent. However, only those materials which do not adversely effect the polymerization rate or the surface-active materials are desirable.

When polymeric materials that are heated above their glass transition temperature as determined by DSC can become rubbery, such as polyacrylates or acrylate copolymers which have glass transition temperatures around room termperature and have a plasticizing monomer incorporated therein such as, for example, 2-ethylhexylacrylate, careful handling of the product is required. After polymerization in a pressure vessel if the product is to be isolated as an unexpanded particle the temperature of the reaction mixture, and the atmosphere in which it is being handled, must be at least about 5° below the glass transition temperature of the polymer. Otherwise, expansion will occur when the pressure is released from the polymerization vessel. Beneficially, in many instances where the desired product is the expanded bead, the polymerization vessel may be vented at a temperature above the glass transition temperature of the polymer and a slurry of expanded particles obtained which are readily separated from the liquid by flotation and dried by centrifugation and similar conventional methods.

The expandable particles are useful in insulation, packaging, for expanding other polymer such as polytetrafluoroethylene, and the like.

EXAMPLE 1

An oil phase mixture was prepared utilizing 100 parts of methyl methacrylate, 31 parts of 1, 1, 1, 2, 3, 4, 4, 5, 5, 5-decafluoro pentane (normal boiling point between 50° and 60° C., available under the trade name of "Vertrel XF" from Du Pont), 21 parts of PF-5060 Performance Fluid (normal boiling point between 50° and 60° C., a commercial perfluorinated fluid, primarily perfluorinated hexanes available from 3M), 2.6 parts of DBE-6 dibasic ester (dimethyl adipate, obtained from the DuPont Co.) and 0.1 part of benzoyl peroxide. Separately, an aqueous phase mixture was prepared utilizing 100 parts of distilled deionized water, 15 parts of colloidal silica dispersion (30 weight percent solid, available under the trade name of "Ludox HS-30"), 0.67 parts of a solution containing 25 weight percent of a condensation product of diethanolamine and adipic acid, and 1 part of a solution containing 2.5 weight percent sodium dichromate. The pH value of the aqueous phase mixture was adjusted between 3 and 6 with hydrochloric acid. After the oil phase and aqueous phase were mixed, the mixture was violently mixed by a homogenizer (OMNI PRO 300 type, available from PRO Scientific Inc.) at 6000 rpm for 4 minutes, and then the resultant mixture was immediately transferred to a pressure reactor and sealed. The reaction mixture was maintained at a temperature of 80° C. for a period of 20 hours under mild rotation of 40 rpm. The obtained product was washed and dried via freezing and vacuum drying. The obtained microparticles had number average particle sizes between 2 and 50 $\mu$m determined by scan electron microscopy (which is the method for determination of particle size in all examples), and gave the maximum volumetric expansion ratio of about 20 times or more when samples are placed in a thin and long glass tube, uniform in certain diameter, heated in silicone oil bath at a temperature of 150° C. for 3 to 5 minutes. The volume expansion ratio is determined by marking the height of total unexpanded particles residing inside the thin glass tube and the height of the expanded particles inside the tube. Assuming uniformity in glass tube diameter, initial volume before thermal expansion and final volume after thermal expansion can be determined. The volume expansion ratio is essentially the height ratio if the diameter of the glass tubing remains constant, which is the case for all examples hereafter.

EXAMPLE 2

The procedure of example 1 was repeated with the exception that (31 parts of Vertrel XF and 21 parts of PF-5060) was replaced by (41.5 parts of Vertrel XF and 10.5 parts of PF-5060), and 2.6 parts of DBE-6 was replaced by 1 part of DBE-5 (dimethyl glutarate) in the oil phase mixture. The obtained microparticles had particle sizes between 2 and 60 $\mu$m, and had a maximum volumetric expansion ratio of about 10 times when heated in silicone oil bath at a temperature of 150° C. for 3 to 5 minutes.

EXAMPLE 3

The procedure of example 1 was repeated with the exception that (31 parts of Vertrel XF and 21 parts of PF-5060) was replaced by 52 parts of PF-5060 in the oil phase mixture. The oil phase was a heterogeneous 2-phase mixture. The obtained microparticles had particle sizes between 2 and 60 mm, and had a maximum volumetric expansion ratio of about 12 times when heated in silicone oil bath at a temperature of 150° C. for 3 to 5 minutes.

EXAMPLE 4

The procedure of example 1 was repeated with the exception that 21 parts of PF-5060 were replaced by 21 parts of Performance Fluid PF-5070 (normal boiling point between 75° to 90° C., a perfluorinated fluid supplied by 3M) in the oil phase mixture. The obtained microparticles had particle sizes between 5 and 50 μm, and had a maximum volumetric expansion ratio of about 11 times when heated in silicone oil bath at a temperature of 160° C. for 3 to 5 minutes.

EXAMPLE 5

The procedure of example 1 was repeated with the exception that 21 parts of PF-5060 were replaced by 21 parts of Fluorinert FC-84 (normal boiling point around 80° C., a perfluorinated fluid supplied by 3M) in the oil phase mixture. The obtained microparticles had particle sizes between 5 and 50 μm, and had a maximum volumetric expansion ratio of about 11 times when heated in silicone oil bath at a temperature of 160° C. for 3 to 5 minutes.

EXAMPLE 6

The procedure of example 1 was repeated with the exception that 21 parts of PF-5060 were replaced by 21 parts of perfluoro dimethylcyclohexane (normal boiling point around 102° C., Supplied by PCR, Inc.) in the oil phase mixture. The obtained microparticles had particle sizes between 5 and 30 μm, and had a maximum volumetric expansion ratio of about 7 times when heated in silicone oil bath at a temperature of 160° C. for 3 to 5 minutes.

EXAMPLE 7

The procedure of example 1 was repeated with the exception that 2.6 parts of DBE-6 dibasic ester was replaced by 4.7 parts of methyl caprylate in the oil phase mixture. The obtained microparticles had particle sizes between 2 and 40 μm, and had a maximum volumetric expansion ratio of about 7 times when heated in silicone oil bath at a temperature of 150° C. for 3 to 5 minutes.

EXAMPLE 8

The procedure according to example 1 was repeated, with the exception that 2.6 parts of DBE-6 dibasic ester was replaced by 2.4 parts of DBE-5 dibasic ester (dimethyl glutarate) in the oil phase mixture. The obtained microparticles had particle sizes between 2 and 40 μm, and had a maximum volumetric expansion ratio of about 8 times when heated in silicone oil bath at a temperature of 150° C. for 3 to 5 minutes.

EXAMPLE 9

The procedure of example 1 was repeated, with the exception that 2.6 parts of DBE-6 dibasic ester was replaced by 2.8 parts of dimethyl 2,4-dimethylglutarate in the oil phase mixture. The obtained microparticles had particle sizes between 2 and 35 μm, and had a maximum volumetric expansion ratio of about 7 times when heated in silicone oil bath at a temperature of 150° C. for 3 to 5 minutes.

EXAMPLE 10

The procedure of example 1 was repeated, with the exception that 2.6 parts of DBE-6 dibasic ester was replaced by 3 parts of dimethyl suberate was in the oil phase mixture. The obtained microparticles had a average particle size of 15.33 μm, and had a maximum volumetric expansion ratio of about 6 times when heated in silicone oil bath at a temperature of 150° C. for 3 to 5 minutes.

EXAMPLE 11

The procedure of example 1 was repeated, with the exception that 2.6 parts of DBE-6 dibasic ester was replaced by 4 parts of dimethyl hexafluoro glutarate in the oil phase mixture. The obtained microparticles had a average particle size of 12.1 μm, and had a maximum volumetric expansion ratio of about 5 times when heated in silicone oil bath at a temperature of 150° C. for 3 to 5 minutes.

EXAMPLE 12

The procedure according to example 1 was repeated, with the exception that 2.6 parts of DBE-6 dibasic ester was replaced by 4.7 parts of dimethyl octafluoro adipate in the oil phase. The obtained microparticles had a average particle size of 8.8 μm, and had a maximum volumetric expansion ratio of about 4 times when heated in silicone oil bath at a temperature of 150° C. for 3 to 5 minutes.

EXAMPLE 13

The procedure of example 1 was repeated, with the exception that 100 parts of methyl methacrylate was replaced by (50 parts of methyl methacrylate and 50 parts of vinyl acetate) in the oil phase mixture. The obtained microparticles had particle sizes between 2 and 40 μm, and had a maximum volumetric expansion ratio of about 7 times when heated in silicone oil bath at a temperature of 150° C. for 3 to 5 minutes.

EXAMPLE 14

The procedure of example 1 was repeated, with the exception that 100 part of methyl methacrylate was replaced by (50 parts of methyl methacrylate and 50 parts of acrylonitrile) in the oil phase mixture. The obtained microparticles had particle sizes between 2 and 40 μm, and had a maximum volumetric expansion ratio of about 4 times when heated in silicone oil bath at a temperature of 150° C. for 3 to 5 minutes.

Examples A and B, following, illustrate the consequences when the hydrocarbon ester or ether or ketone of the previous examples is omitted.

EXAMPLE A

Example 1 was repeated except that there was no DBE-6 dibasic ester was employed in the oil phase mixture. The obtained microparticles had particle sizes between 2 and 30 μm, and had a maximum volumetric expansion ratio of less than 2 times when heated in silicone oil bath at a temperature of 150° C. for 3 to 5 minutes. The microparticles made in this example are useless in any application.

EXAMPLE B

Example 2 was repeated except that there was no DBE-6 dibasic ester employed in the oil phase mixture. The obtained microparticles had particle sizes between 2 and 40 μm, and had a maximum volumetric expansion ratio of less than 2 times when heated in silicone oil bath at a temperature of 150° C. for 3 to 5 minutes. The microparticles made in this example are useless for any application.

Although particular embodiments of the present invention are disclosed herein, it is not intended to limit the invention to such a disclosure and changes and modifications may be incorporated and embodied within the scope of the following claims.

The invention claimed is:

1. Particles comprising:

a thermally expandable polymer shell that forms an enclosure for a hollow interior;

said hollow interior having within it:

a) at least one fluorinated hydrocarbon fluid of 2 to 30 carbon atoms that optionally contains chlorine, hydrogen, oxygen or nitrogen, and having a boiling point between −30° and 300° C., said boiling point being below the melting point of the expandable polymer;

b) at least one organic ester or ether or ketone having 4 to 400 carbon atoms;

said a) and b) components present in an amount sufficient to cause expansion of the thermally expandable polymer when thermal energy is applied to the particle.

2. The particles of claim 1, wherein the hydrocarbon fluid is perfluorinated.

3. The particles of claim 2, wherein the perfluoroinated hydrocarbon fluid is a perfluorinated alkane.

4. The particles of claim 1, wherein the organic ester or ether or ketone is selected from mono-ester, mono-ether, mono-ketone, dibasic esters, di-ethers, poly-esters, or poly-ethers.

5. The particles of claim 4, wherein the organic ester or ether or ketone is selected from polyalkylene oxide, polyalkylene glycol, alkyl ketone, dialkyl ether, dialkyl adipate, dialkyl glutarate, dialkyl succinate, dialkyl suberate, trialkyl citrate wherein the alkyl group is from carbon number 1 to 10.

6. The particles of claim 5, wherein the organic ester or ether or ketone is a dibasic ester.

7. The particles of claim 1, having a number average diameter of between 1 and 200 micrometers.

8. The particles of claim 1, wherein the expandable polymer is selected from polymers made from the monomers: (1) nitrile containing compounds; (2) alkenyl aromatic compounds; (3) acrylate or methacrylate containing compounds; (4) unsaturated acids of carbon number from 3 to 10; (5) vinyl alkyl ether compounds; and (6) halogenated monomers.

* * * * *